United States Patent
Roy et al.

(10) Patent No.: US 11,037,190 B2
(45) Date of Patent: Jun. 15, 2021

(54) WEB PAGE PERFORMANCE IMPROVEMENT SYSTEM

(71) Applicant: Microsoft Technology Licensing, LLC, Redmond, WA (US)

(72) Inventors: Paul John Roy, Seattle, WA (US); Arthesh Satish Kumar, Redmond, WA (US); Somenath Dey, Redmond, WA (US); Amiya Gupta, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 325 days.

(21) Appl. No.: 15/846,977

(22) Filed: Dec. 19, 2017

(65) Prior Publication Data

US 2019/0139080 A1    May 9, 2019

Related U.S. Application Data

(60) Provisional application No. 62/583,874, filed on Nov. 9, 2017.

(51) Int. Cl.
*G06Q 30/02* (2012.01)
*G06F 16/957* (2019.01)
*H04L 29/06* (2006.01)

(52) U.S. Cl.
CPC ....... *G06Q 30/0244* (2013.01); *G06F 16/957* (2019.01); *G06Q 30/0246* (2013.01); *G06Q 30/0247* (2013.01); *H04L 63/10* (2013.01)

(58) Field of Classification Search
None
See application file for complete search history.

(56) References Cited

U.S. PATENT DOCUMENTS

2007/0027751 A1* 2/2007 Carson ................ G06F 17/2785
705/14.46
2008/0183672 A1* 7/2008 Canon ................. G06F 16/9577
(Continued)

OTHER PUBLICATIONS

Jha et al., "Recent Advances in Intrusion Detection," 13th International Symposium, RAID 2020, Ottawa, Ontario, Canada, Sep. 2010. (Year: 2010).*

(Continued)

*Primary Examiner* — Christopher B Tokarczyk
(74) *Attorney, Agent, or Firm* — Ray Quinney & Nebeker; Tiffany Healy

(57) ABSTRACT

Methods and devices for determining third party content to display on one or more webpages may include receiving an identification of at least one third party content for analysis. The methods and devices may include receiving third party content performance metric information for the at least one third party content based on an analysis of the at least one third party content. The methods and devices may include determining whether the third party content performance metric information is within a performance threshold level and sending a third party content control message that prevents the at least one third party content from presentation on the webpage based at least on the third party content performance metric information exceeding the performance threshold level.

20 Claims, 6 Drawing Sheets

(56) References Cited

U.S. PATENT DOCUMENTS

| | | | |
|---|---|---|---|
| 2014/0025807 A1* | 1/2014 | Wiener | G06F 15/173 |
| | | | 709/224 |
| 2015/0304398 A1* | 10/2015 | Letca | G06F 11/3466 |
| | | | 709/203 |
| 2016/0050129 A1 | 2/2016 | Hoyne | |
| 2016/0085661 A1* | 3/2016 | Clement | G06F 16/27 |
| | | | 717/125 |
| 2016/0277516 A1 | 9/2016 | Hummel et al. | |
| 2016/0352804 A1 | 12/2016 | Foss et al. | |
| 2016/0359988 A1* | 12/2016 | Kazerani | G06F 16/9574 |
| 2017/0192984 A1* | 7/2017 | Galarneau | H04L 67/02 |
| 2017/0236211 A1 | 8/2017 | White et al. | |
| 2018/0159844 A1* | 6/2018 | Barfonchovski | G06F 9/45558 |
| 2018/0329788 A1* | 11/2018 | Blum | G06F 11/3688 |

OTHER PUBLICATIONS

"International Search Report and Written Opinion Issued in PCT Application No. PCT/US2018/058816", dated Jan. 2, 2019, 12 Pages.

\* cited by examiner

| 3rd Party Content ID 12 | 3rd Party Content Provider 302 | 3rd Party Content Size 304 | Market 306 | Impression Count 36 | 3rd Party Content Revenue 40 ($) | Long Frame Score 19 | CPU Consumption 21 (MS) | Byte Info 23 (KB) | Total Requests 25 |
|---|---|---|---|---|---|---|---|---|---|
| 1234 | Company A | 300x250 | US | 13670167 | 27,921 | 34 | 7279 | 294 | 38 |
| 1235 | Company B | 300x250 | CA | 83355777 | 139,116 | 104 | 7021 | 154 | 36 |
| 1236 | Company B | 300x250 | US | 83355777 | 139,116 | 104 | 7021 | 154 | 36 |
| 1237 | Company C | 728x90 | US | 6932902 | 25,049 | 40 | 3655 | 431 | 25 |
| ... | | | | | | | | | |

FIG. 3

| 3rd Party Content ID 12 | 3rd Party Content Provider 302 | Flash? 404 | HTML 406 (KB) | JS 408 (KB) | CSS 410 (KB) | Image 412 (KB) | Video 414 (KB) | Flash 416 (KB) | Image Req. 417 | Video Req. 418 | Flash Req. 419 |
|---|---|---|---|---|---|---|---|---|---|---|---|
| 1234 | Company A | Y | 6 | 160 | 1 | 10 | 0 | 18 | 6 | 0 | 5 |
| 1235 | Company B | N | 4 | 72 | 2 | 31 | 0 | 0 | 10 | 0 | 0 |
| 1236 | Company B | N | 4 | 72 | 2 | 31 | 0 | 0 | 10 | 0 | 0 |
| 1237 | Company C | N | 22 | 51 | 0 | 99 | 0 | 0 | 49 | 0 | 0 |
| ... | | | | | | | | | | | |

WEB PAGE PERFORMANCE IMPROVEMENT SYSTEM

RELATED APPLICATION

This application claims priority to U.S. Application No. 62/583,874 titled "Web Page Performance Improvement System," filed Nov. 9, 2017, which is incorporated herein by reference in its entirety.

BACKGROUND

The present disclosure relates to apparatus and methods of improving a performance of third party content presented on webpages.

Web site performance across the internet is increasingly being impacted by third party content that requires a lot of resources to be displayed on a web page. One impact is on the load and render time of a page's core content. But another, and perhaps more significant, impact is on interactivity of the page after it loads. Some content, such as third party content, causes significant delays during user interaction (scroll, type, etc.) and can result in a lack of smoothness during scrolling or animations. These problems can be very severe, resulting in decreased page engagement and decreased customer satisfaction. A challenge is that there are vast numbers of third party content rotating through a website, and yet only a minority are causing problems.

Thus, there is a need in the art for improvements in displaying content on webpages.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include memory configured to store data and instructions, at least one processor configured to communicate with the memory, an operating system configured to communicate with the memory and the processer. The operating system may be operable to receive an identification of at least one third party content for analysis; receive third party content performance metric information for the at least one third party content based on an analysis of the at least one third party content; determine whether the third party content performance metric information is within a performance threshold level; and send a third party content control message that prevents the at least one third party content from presentation on the webpage based at least on the third party content performance metric information exceeding the performance threshold level.

Another example implementation relates to a method for determining third party content to display on one or more webpages. The method may include receiving, at an operating system on the computer device, an identification of at least one third party content for analysis. The method may include receiving third party content performance metric information for the at least one third party content based on an analysis of the at least one third party content. The method may include determining whether the third party content performance metric information is within a performance threshold level; and sending a third party content control message that prevents the at least one third party content from presentation on the webpage based at least on the third party content performance metric information exceeding the performance threshold level.

Another example implementation relates to computer-readable medium storing instructions executable by a computer device. The computer-readable medium may include at least one instruction for causing the computer device to receive an identification of at least one third party content for analysis. The computer-readable medium may include at least one instruction for causing the computer device to receive third party content performance metric information for the at least one third party content based on an analysis of the at least one third party content. The computer-readable medium may include at least one instruction for causing the computer device to determine whether the third party content performance metric information is within a performance threshold level. The computer-readable medium may include at least one instruction for causing the computer device to send a third party content control message that prevents the at least one third party content from presentation on the webpage based at least on the third party content performance metric information exceeding the performance threshold level.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIG. 3 is an example report illustrating captured third party content performance metric information in accordance with an implementation of the present disclosure;

FIG. 4 is an example report illustrating captured third party content performance metric information in accordance with an implementation of the present disclosure;

DETAILED DESCRIPTION

Figure 1:
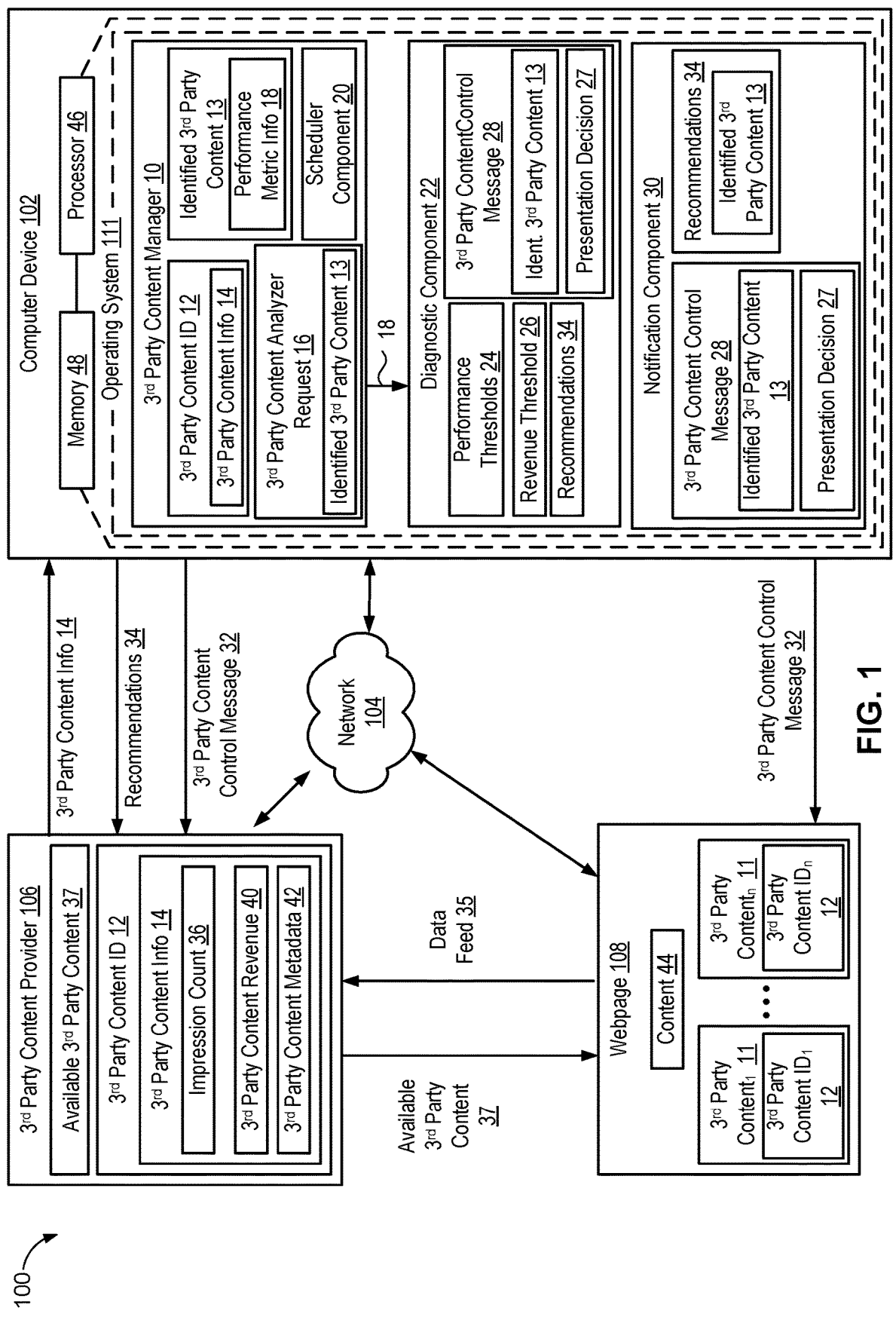
FIG. 1 is a schematic block diagram of an example system in accordance with an implementation of the present disclosure.

This disclosure relates to devices and methods for assessing the performance of third party content on webpages. Generally, faster webpages may result in improved website operation and improved business metrics of the content provider, such as, page views, page clicks, conversion, and/or customer satisfaction with the webpage. Similarly, slower pages may negatively impact website operation and business metrics and customer satisfaction. Because third party content is contained on webpages, the loading of third party content creates resource contention with the loading of page content, meaning third party content that uses more network resources may result in slower pages and worse business metrics. In addition, third party content that uses more network resources may impact a user's ability to interact with a page after it's been loaded—manifesting as delays or jerkiness in responding to user attempts to click and/or scroll on the webpage. These interactivity problems may also negatively impact business metrics and customer satisfaction of the content provider.

The devices and methods described herein may identify one or more third party content for additional processing. The identified third party content may include new third party content prior to presentation on webpages and/or third party content presented on webpages that may be causing poor performance of a webpage. The devices and methods may analyze the identified third party content in isolation to determine performance metric information of the third party content when presented on a webpage. The performance metric information may identify the impact of the third party content on the network (e.g., delays in loading of webpage content and/or other functionality on the webpage) and/or the interactivity of the webpage (e.g., an ability of the webpage to provide a smooth and responsive experience to a user). The devices and methods may also capture diagnostic information that may be used to identify areas of improvement for the identified third party content. Examples of areas of improvement for the identified third party content may include, but are not limited to, refactor creatives to use single version of a library, limiting the file size of the third party content within standards, reducing the number of JavaScript (JS) code used in the third party content, avoiding using long running scripts and/or frames, avoiding CPU intensive operations, and/or ensuring network calls made and files downloaded are valid and required. The diagnostic information may include, but is not limited to, the network waterfall and/or central processing unit (CPU) traces. The network waterfall may demonstrate calls made across the network to get resources and/or content that may be required for rendering the targeted webpage. The network waterfall may show, for example, a start and/or end time of network calls, duration, and/or a type of resource retrieved in a sequential manner.

The devices and methods may compare the performance metric information to one or more configurable threshold levels to ascertain the identified third party content impact on the network and/or interactivity of the webpage. The devices and methods may identify third party content to block from presentation on webpages in order to improve the network performance (e.g., faster loading of content on the webpages) and/or interactivity of a webpage (e.g., reducing delays in responses to user input). In addition, the devices and methods may provide recommendations for improving the third party content to the third party content providers and/or third party content developers.

As such, the third party content ecosystem may be improved by proactively blocking heavy (e.g., resource intensive) third party content before they appear on a webpage and/or reactively blocking heavy third party content after they appear on a webpage so that network and/or webpage performance may be improved. Moreover, by identifying problem areas of third party content and/or providing recommendations for improving third party content performance, the performance of webpages may be improved, and thus, improving user interactivity with the webpages. For example, content on webpages may be loaded quicker and the webpages may provide a smooth and responsive experience to the users.

Figure 2:
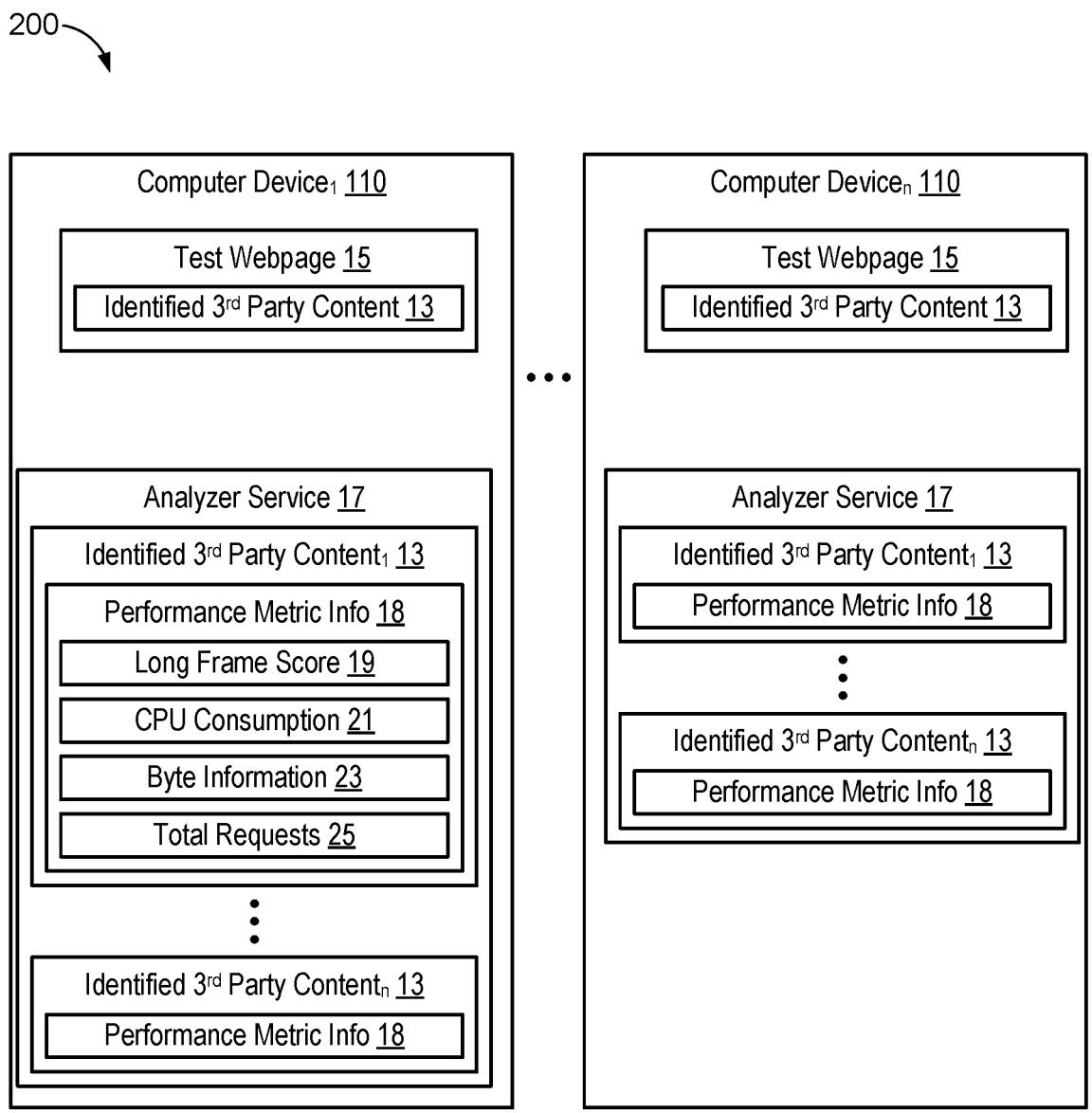
FIG. 2 is a schematic block diagram of an example third party content analyzing system in accordance with an implementation of the present disclosure.

Referring now to FIGS. 1 and 2, illustrated are example systems 100 and 200 that may be used to assess the performance of third party content 11, such as advertisements ("ads") displayed on webpages 108 and improve network and/or webpage performance. For example, one or more (e.g., up to n, where n is an integer) third party content 11 may be presented on a plurality of webpages 108 along with additional content 44 of webpages 108. Content 44 may be any information presented on webpage 108 independent of third party content 11. As such, third party content 11 may be separate from content 44. In addition, third party content 11 may be non-webpage specific and may be displayed on a plurality of webpages 108. Webpages 108 may operate on computer device 102 and/or any other device in communication with computer device 102 via network 104.

One or more third party content providers 106 may be in communication with webpages 108 and/or computer device 102. Third party content providers 106 may determine one or more available third party content 37 that may be displayed on webpage 108 and may communicate the available third party content 37 to webpage 108. For example, third party content providers 106 may provide a third party content exchange that provides thousands of available third party content 37 that may be presented on webpages 108.

Third party content providers 106 may receive one or more data feeds 35 from webpages 108 with different third party content information 14 for the third party content 11 displayed on webpage 108. Third party content information 14 may include, but is not limited to, impression counts 36 (e.g., a number of times the third party content 11 was reviewed or selected), third party content revenue 40 (e.g., an amount of revenue generated by the third party content), and other third party content metadata 42 that may be captured about the third party content. Third party content providers 106 may receive the third party content information 14 from the one or more data feeds 35 and may associate the receive third party content information 14 with the corresponding third party content identification (ID) 12. As such, for each third party content 11 displayed on webpage 108, the corresponding third party content information 14 may be provided to third party content provider 106. Third party content provider 106 may transmit the third party content information 14 to computer device 102 for further processing.

Computer device 102 may include an operating system 111 executed by processor 46 and/or system memory 48 of computer device 102. System memory 48 may be configured for storing data and/or computer-executable instructions defining and/or associated with operating system 111, and processor 46 may execute operating system 111. An example of system memory 48 can include, but is not limited to, a type of memory usable by a computer, such as random access memory (RAM), read only memory (ROM), tapes, magnetic discs, optical discs, volatile memory, non-volatile memory, and any combination thereof. An example of processor 46 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a server computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Operating system 111 may include a third party content manager 10 that receives the third party content information 14 associated with each third party content ID 12. In an implementation, third party content manager 10 may operate on operating system 111. Third party content manager 10 may store the received third party content information 14 in, for example, a data store. In addition, third party content manager 10 may analyze the received third party content information 14 and may identify one or more third party content 13 for further analysis. Third party content manager 10 may schedule batches of identified third party content 13 for further analysis based on configurable criteria. Configurable criteria may include, but is not limited to, third party content having the most impressions across certain markets, third party content having the most revenue across certain markets, and third party content having the most clicks. For example, third party content manager 10 may identify third party content 13 based on impression count 36 information and may order the third party content based on the impression count 36 information with the highest number of impression counts 36 relative to other third party content listed first. Third party content manager 10 may select one or more third party content 13 from the list for further processing. As such, the analysis request may be a retroactive analysis of the third party content after displaying the third party content on webpage 108.

In an implementation, third party content manager 10 may receive an identification of one or more third party content 13 for additional processing. For example, a user and/or third party content exchange may identify a new third party content 13 to analyze, for example, before displaying the new third party content on webpage 108. As such, the analysis request may be a proactive upfront analysis of the new third party content 13 prior to displaying the new third party content 13 on webpage 108.

Third party content manager 10 may generate a third party content analyzer request 16 with the identified third party content 13 to request further analysis of the identified third party content 13. Third party content manager 10 may send the third party content analyzer request 16 to one or more analyzer services 17 (FIG. 2) for additional processing.

Continuing with the example, with specific reference to FIG. 2, illustrated is an example system 200 that may be used in connection with system 100 to analyze the performance of one or more identified third party content 13. System 200 may include one or more computer devices 110 in communication, for example, via a network. In an implementation, system 200 may be a controlled environment where each of the one or more computer devices 110 may be identical to each other with a test webpage 15 operating on the computer devices 110. The test webpages 15 may be used to load and present the one or more identified third party content 13. The test webpages 15 may be uniform between computer devices 110 (e.g., the other content presented on the test pages may be the same among the test pages 15) and may be used to perform additional processing on the identified third party content 13. In addition, computer devices 110 may have other network traffic restricted from operating on computer devices 110. By analyzing the third party content performance in a controlled environment with restricted network traffic operating on computer devices 110, an accuracy of the results may be achieved. Moreover, with a vast number of third party content provided from a variety of locations rotating on websites 108 through various third party content exchanges, it is difficult to identify performance issues from the third party content. As such, by analyzing the third party content performance in a controlled environment, it may be possible to identify the third party content performance and areas of improvement for the third party content.

Computer devices 110 may each include an analyzer service 17 operable to analyze the third party content performance for each identified third party content 13 when the identified third party content 13 is loaded on the test webpage 15. For example, analyzer service 17 may trace an amount of CPU usage and/or Java script execution when the identified third party content 13 are presented on the test webpage 15. Because other network traffic is restricted on computer devices 110, analyzer service 17 may identify the amount of CPU usage and/or Java script execution used by the identified third party content 13.

For each identified third party content 13, analyzer service 17 may generate third party content performance metric information 18 based on information collected by analyzer service 17 when the identified third party content 13 is loaded and displayed on the test webpage 15. Third party content performance metric information 18 may represent a performance of each identified third party content 13. Examples of different types of third party content performance metric information 18 are described in detail below. Analyzer service 17 may capture information for each identified third party content 13 up to n identified third party content 13 (where n is an integer) that may provide proof of network and interactivity impacts on the test webpage 15. For example, analyzer services 17 may capture information corresponding to other resources (e.g., files, images, scripts, and/or fonts) downloaded by the identified third party content 13 and the associated metrics information, such as, connection times and/or bytes transferred. Analyzer services 17 may operate on a plurality of computer devices 110 so that a plurality of identified third party content 13 may be tested concurrently. In an implementation, system 200 may be used to analyze thousands of identified third party content 13.

Third party content performance metric information 18 may identify the impact of third party content on the network. For example, a heavy network tax (e.g., a large network usage by the third party content) may delay loading of webpage content and other functionality on the webpage. In addition, third party content performance metric information 18 may identify the impact of a third party content on an interactivity of the webpage. For example, a heavy interactivity (e.g., causes delays in webpage interactivity) may impact an ability of a webpage to provide a smooth and responsive experience to a user of the webpage, and thus, the webpage may lack smoothness of the webpage during scrolling and/or animations. As such, third party content performance metric information 18 may include a variety of metrics captured by analyzer service 17 for the identified third party content 13.

One example of third party content performance metric information 18 may include a long frame score 19 that indicates a degree to which the third party content causes long frames. A long frame may cause jerky scrolling and/or animations because a browser may be unable to maintain a high frame rate when processing content and/or other information for the webpage. In addition, long frames may delay input processing because a browser may be unable to process keystrokes, clicks, or other user input in a timely manner. For example, a long frame score 19 may be a measure of an impact by analyzer service 17 of the identified third party content 13 based on an ability of the test webpage 15 to provide a smooth and responsive experience to the user. The long frame score 19 may be calculated by analyzer service 17, for example, as the number of 50 ms units contained within any frame that is longer than 50 ms. For example, a frame of 50 ms would contribute a value of 1 to a long frame score 19, while a frame of 510 ms would contribute a value of 10 to a long frame score 19. One example of a cause of long frames may include JavaScript code and/or libraries monopolizing the CPU in a way that prevents the browser from getting control and writing frames to the screen.

Another example of third party content performance metric information 18 may include CPU consumption 21 of the identified third party content 13. For example, analyzer service 17 may measure the amount of CPU consumed over a 30 second period when the identified third party content 13 is loaded on test webpage 15. One example cause of excessive CPU usage may be JavaScript code and/or libraries monopolizing the CPU in a way that prevents the browser from getting control and writing frames to the screen.

Another example of third party content performance metric information 18 may include byte information 23 of the identified third party content 13. Analyzer service 17 may determine a total number of bytes (KB) downloaded over the network for all third party content-related assets, including, but not limited to, Hypertext Markup Language (HTML), Javascript (JS), cascading style sheet (CSS), images, and analytics calls.

Another example of third party content performance metric information 18 may include a total number of requests 25 made by the identified third party content 13. For example, analyzer service 17 may track a the total number of HTTP requests over the network for all third party content-related assets, including, but not limited to, HTML, JS, CSS, images, and analytics calls.

In addition to the above examples, a plurality of other performance metric information may be captured by analyzer service 17 for each identified third party content 13, including, but not limited to, whether the third party content has flash (e.g., flash movie files with a file format of Shock Wave Flash (SWF)), a size of the third party content, a number of HTML requests made by the third party content, a number of video requests made by the third party content, and/or a number of flash requests made by the third party content. Using flash files may cause inefficiencies in the third party content and/or webpages, for example, in power consumption and/or speed. In addition, flash files may cause security issues in the webpages and/or third party content.

Analyzer service 17 may also capture diagnostic information for each identified third party content 13 that may provide proof of network and interactivity impacts on the test webpage 15. The diagnostic information may include, but is not limited to, network waterfall information (e.g., identifying calls made across the network to get resources and/or content that may be required for rendering the targeted webpage) and/or CPU traces to help identify the network and interactivity impacts of each identified third party content 13. For example, CPU traces may show an amount of the CPU being used over a duration of time to render the identified third party content 13. A CPU trace may show how much of the processor power was used to execute scripts that were used to render the identified third party content 13. A CPU trace may also separate the CPU usage by Rendering, Scripting, and/or Painting tasks. As such, CPU traces may enable drilling down into a particular long running activity or a long frame to detect what component and/or script may be responsible for the delay. Thus, the CPU traces may be used to associate network traffic with the third party content initiating the network traffic along with the bandwidth utilization of the third party content. In addition, the captured diagnostic information may be used in identifying areas for improvement of the identified third party content 13.

Referring back to FIG. 1, third party content manager 10 may receive the third party content performance metric information 18 for each identified third party content 13 from analyzer service 17 (FIG. 2) and may store the third party content performance metric information 18 received, for example, in a data repository. In addition, third party content manager 10 may transmit the third party content performance metric information 18 to a diagnostic component 22 for further analysis of the third party content performance metric information 18.

Diagnostic component 22 may receive the third party content performance metric information 18 for the identified third party content 13 and may perform additional analysis on the third party content performance metric information 18. For example, diagnostic component 22 may compare the third party content performance metric information 18 to one or more performance thresholds 24 to determine whether the identified third party content 13 may affect the functionality or performance of the network and/or webpage 108. The performance thresholds 24 may be configurable values that may change based on a percentage of improvement for the network and/or webpage performance. For example, diagnostic component 22 may compare the long frame score 19, the CPU consumption 21, the byte information 23, and/or the total requests 25 to one or more performance thresholds 24. In an implementation, each of the long frame score 19, the CPU consumption 21, the byte information 23, and/or the total requests 25 may be associated with a different performance threshold 24. As such, when one or more of the long frame score 19, the CPU consumption 21, the byte information 23, and/or the total requests 25 exceeds the one or more performance thresholds 24, diagnostic component 22 may determine that identified third party content 13 may not be displayed on webpage 108 because the network and/or webpage 108 performance may be adversely impacted by the identified third party content 13 (e.g., delays in user interaction, lack of smoothness in animation, and/or delays in content loading).

Diagnostic component 22 may prepare a third party content control message 28 based on the comparison of the third party content performance metric information 18 to one or more performance thresholds 24. The third party content control message 28 may provide a presentation decision 27 for the identified third party content 13. When the third party content performance metric information 18 is below the one or more performance thresholds 24, the presentation decision 27 for the identified third party content 13 may be to continue to allow the identified third party content 13 to be displayed on webpage 108. However, when the third party content performance metric information 18 exceeds the one or more performance thresholds 24, the presentation decision 27 for the identified third party content 13 may be to prevent and/or block the identified third party content 13 from displaying on webpage 108. For example, when the long frame score 19 exceeds a performance threshold 24 and the CPU consumption 21 is below the performance threshold 24, the presentation decision 27 may be to prevent and/or block the identified third party content 13 from displaying on webpage 108.

Notification component 30 may transmit the third party content control message 28 with the presentation decision 27 for the identified third party content 13 to webpage 108. Webpage 108 may remove the identified third party content 13 from displaying on webpage 108 when the presentation decision 27 is to block and/or prevent the identified third party content 13 from display on webpage 108. In addition, webpage 108 may continue to display the identified third party content 13 on webpage 108 when the presentation decision 27 is to continue to display the identified third party content 13 on webpage 108.

In addition, notification component 30 may transmit the third party content control message 32 with the presentation decision 27 for the identified third party content 13 to third party content provider 106. For example, third party content provider 106 may remove the identified third party content 13 from the third party content exchange and/or the list of available third party content 37 presented to webpage 108 when the presentation decision is to block and/or remove the identified third party content 13 from webpage 108. In addition, third party content provider 106 may continue to provide the identified third party content 13 in the third party content exchange and/or list of available third party content 37 provided to webpage 108 when the presentation decision 27 is to continue to display the identified third party content 13.

Diagnostic component 22 may further compare the third party content revenue 40 with a revenue threshold 26 to identify third party content that may provide a large amount of revenue. For example, when the third party content revenue 40 exceeds the revenue threshold 26, diagnostic component 22 may determine that the identified third party content 13 provides large amounts of revenue. In an implementation, third party content control message 28 may be based on both the performance thresholds 24 and the revenue threshold 26. For example, if the identified third party content 13 exceeds both the performance thresholds 24 and the revenue thresholds 26, the presentation decision 27 may be to continue displaying the identified third party content 13 because of the large amount of revenue generated by the identified third party content 13 even though the performance of the identified third party content 13 may be adverse to webpage 108. Moreover, if the identified third party content 13 exceeds the performance thresholds 24 but is below the revenue threshold 26, the presentation decision 27 may be to prevent and/or block the identified third party content 13 from display on webpage 108. Another example may include when the identified third party content 13 is below both the performance thresholds 24 and the revenue threshold 26, the presentation decision 27 may be to continue displaying the identified third party content 13 on webpage 108.

Diagnostic component 22 may also take further actions regarding the identified third party content 13, such as providing one or more recommendations 34 for third party content improvement. Recommendations 34 may include, but are not limited to, identifying problem areas of the identified third party content 13 (e.g., long frame score 19, the CPU consumption 21, the byte information 23, and/or the total requests 25) based on the performance metric information 18 and/or the diagnostic information captured for the identified third party content 13 and/or providing one or more improvements for third party content performance. For example, when the CPU consumption 21 exceeds a performance threshold 24 level, diagnostic component 22 may provide one or more recommendations 34 for improving the CPU consumption 21 of the identified third party content 13. Moreover, when the third party content revenue 40 exceeds the revenue threshold 26 and one or more performance metric information 18 exceeds a performance threshold 24 level, diagnostic component 22 may provide one or more recommendations 34 for the identified third party content 13.

Notification component 30 may transmit the recommendations 34 to third party content provider 106 and/or a developer of the identified third party content 13 so that the performance of the identified third party content 13 may be improved. By providing recommendations 34 for third party content performance, third party content providers 106 and/or third party content developers may improve the performance of the third party content ecosystem resulting in improved user experiences when accessing webpages 108.

As such, the third party content ecosystem may be improved by proactively blocking heavy third party content before they appear on webpage 108 and/or reactively blocking heavy third party content after they appear on webpage 108. Moreover, by identifying problem areas of third party content and/or providing recommendations for improving third party content performance, the performance of webpages 108 may be improved, and thus, improving user interactivity with the webpages 108.

Referring now to FIG. 3, illustrated is an example report 300 illustrating captured third party content performance metric information 18 (FIG. 1) and additional third party content information 14 (FIG. 1) for one or more identified third party content 13 (FIG. 1). Report 300 may be generated from information captured by analyzer service 17 (FIG. 2) and/or information provided by third party content providers 106 (FIG. 1).

For example, report 300 may include the third party content ID 12 for each third party content included in report 300. Report 300 may also include the third party content provider 302 information for the associated third party content ID 12. As illustrated, third party content ID 1234 is from Company A, while third party content IDs 1235 and 1236 are from Company B. In addition, third party content ID 1237 is from Company C. Report 300 may also indicate a third party content size 304 for the identified third party content listed in report 300. For example, third party content ID 1234 may be a size of 300×250, while third party content ID 1237 may be a size of 728×90.

Report 300 may also include the market 306 where the third party content are presented. For example, third party content ID 1234 was presented in the U.S., while third party content ID 1235 was presented in Canada. In addition, report 300 may show the impression count 36 and the third party content revenue 40 in dollars for the third party content included in report 300. For example, third party content ID 1235 may have a third party content revenue of $139,116 and an impression count of 8,355,777.

Report 300 may also include the third party content performance metric information 18 captured for each of the third party content included in report 300. Report 300 may include the long frame score 19, CPU consumption 21, the byte information 23, and total number of requests 25 for each of the third party content included in report 300. For example, third party content ID 1236 may have a long frame score of 104 and a CPU consumption of 7021 ms. In addition, third party content ID 1236 may be 154 KB and may make at total of 36 requests.

As such, report 300 may provide a variety of information for the third party content included in report 300 that may be used, for example, by diagnostic component 22 (FIG. 1) in determining whether to block third party content from presentation on a webpage and/or for identifying areas for improvement in the third party content.

Referring now to FIG. 4, illustrated is a report 400 with additional information that may be captured by analyzer service 17 (FIG. 2) and/or provided by third party content provider 106 (FIG. 1) for the third party content included in report 300. Report 400 may provide information whether the third party content includes flash 404. For example, third party content ID 1234 may include flash (e.g., flash movie files with a file format of Shock Wave Flash (SWF)), while third party content ID 1235 does not include flash.

Report 400 may also include the amount of space occupied by different aspects of the third party content, including but not limited to, the size of the HTML 406, JS 408, CSS 410, images 412, video 414, and/or flash 416. For example, third party content ID 1237 may have an HTML size of 22 KB, a JS size of 51 KB, and an image size of 99 KB. In addition, third party content ID 1237 may not have any CSS, video, or flash, as such, the size of these fields may be zero.

In addition, report 400 may capture a number of requests made by the third party content included in report 400. Report 400 may identify, for example, a number of image requests 417 made by the third party content, a number of video requests 418 made by the third party content, and/or a number of flash requests 419 made by the third party content. For example, third party content ID 1234 may make 6 image requests, zero video requests, and 5 flash requests.

In addition, to the information illustrated in report 400, analyzer service 17 may capture a variety of other information regarding the third party content that may be used by diagnostic component 22 (FIG. 1) in analyzing the impact of the third party content on the network and/or the interactivity of webpages.

Figure 5:
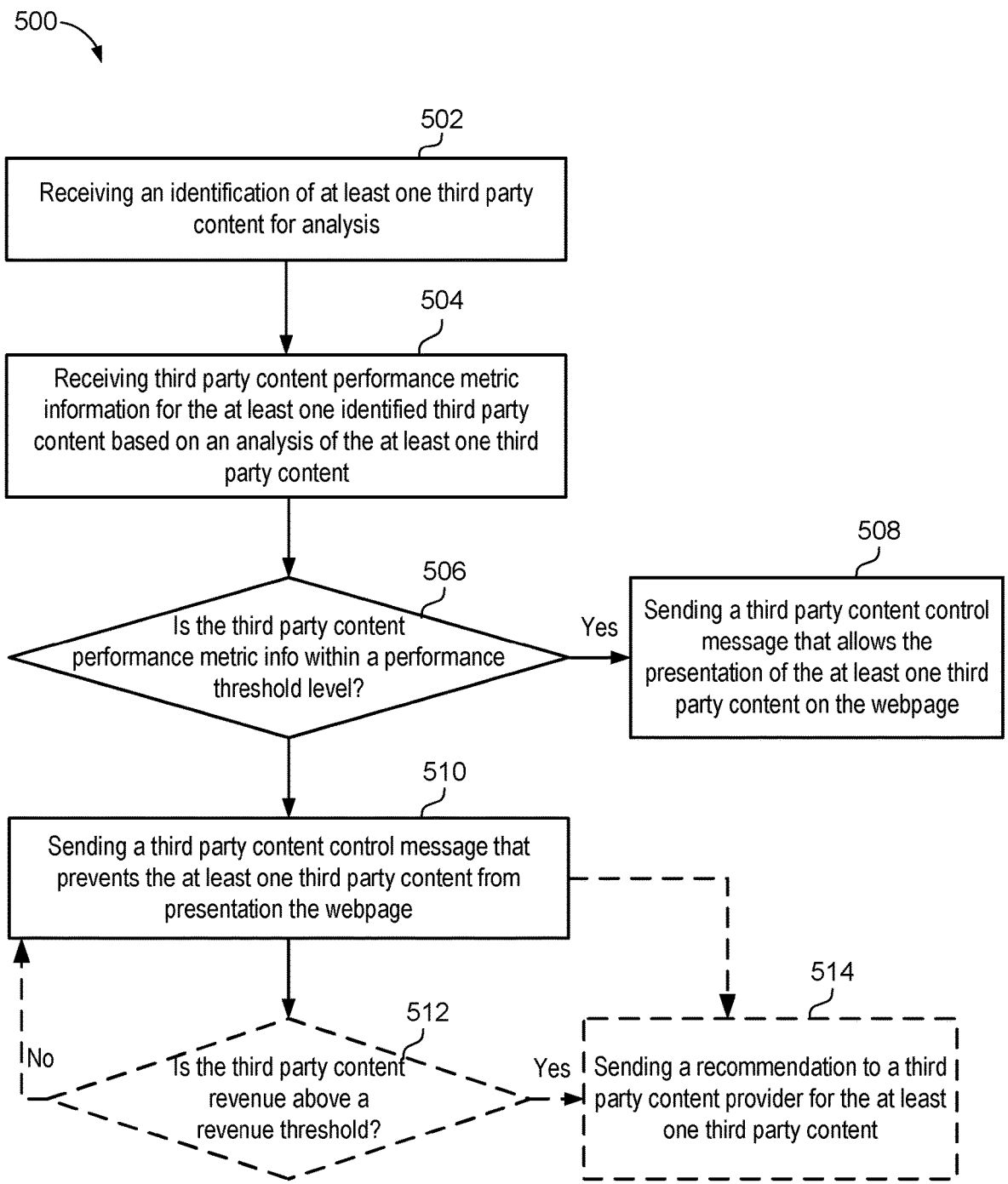
FIG. 5 is an example method flow for determining third party content to display on webpages in accordance with an implementation of the present disclosure.

Referring now to FIG. 5, an example method 500 may be used by computer device (FIG. 1) and/or computer device 110 (FIG. 2) to restrict third party content 11 (FIG. 1) from displaying on webpages 108 (FIG. 1). The actions of method 500 may be discussed below with reference to the architecture of FIG. 1 and/or the architecture of FIG. 2.

At 502, method 500 may include receiving an identification of at least one third party content for analysis. For example, third party content manager 10 may identify one or more third party content 13 for further analysis. The one or more third party content 13 may be third party content that have been presented on one or more webpages 108 and/or may be newly developed third party content. Third party content manager 10 may schedule batches of identified third party content 13 for further analysis based on configurable criteria. For example, third party content manager 10 may schedule third party content 13 based on impression count 36 information and may order the third party content based on the impression count 36 information with the highest number of impression counts 36 relative to other third party content listed first.

In an implementation, third party content manager 10 may receive an identification of one or more third party content 13 for additional processing. For example, a user and/or third party content exchange may identify a new third party content 13 to analyze, for example, before displaying the new third party content on webpage 108.

Third party content manager 10 may generate a third party content analyzer request 16 with the identified third party content 13 to request further analysis of the identified third party content 13. Third party content manager 10 may send the third party content analyzer request 16 to one or more analyzer services 17 (FIG. 2) for additional processing. The analysis request may be a retroactive analysis of the third party content after displaying the third party content on webpage 108. In addition, the analysis request may be a proactive upfront analysis of the new third party content 13 prior to displaying the new third party content 13 on webpage 108.

At 504, method 500 may include receiving third party content performance metric information for the at least one identified third party content based on an analysis of the at least one third party content. Third party content performance metric information 18 may represent a performance of each identified third party content 13. In addition, third party content performance metric information 18 may identify the impact of third party content on the network. For example, a heavy network tax (e.g., a large network usage by the third party) may delay loading of webpage content and other functionality on the webpage. In addition, third party content performance metric information 18 may identify the impact of third party content on an interactivity of the webpage. For example, a heavy interactivity (e.g., causes delays in webpage interactivity) may impact an ability of a webpage to provide a smooth and responsive experience to a user of the webpage, and thus, the webpage may lack smoothness of the webpage during scrolling and/or animations. As such, third party content performance metric information 18 may include a variety of metrics captured by analyzer service 17 for the identified third party content 13.

One example of third party content performance metric information 18 may include a long frame score 19 that indicates a degree to which the third party content causes long frames. A long frame may cause jerky scrolling and/or animations because a browser may be unable to maintain a high frame rate when processing content and/or other information for the webpage. In addition, long frames may delay input processing because a browser may be unable to process keystrokes, clicks, or other user input in a timely manner. For example, a long frame score 19 may be a measure of an impact by analyzer service 17 of the identified third party content 13 based on an ability of the test webpage 15 to provide a smooth and responsive experience to the user. The long frame score 19 may be calculated by analyzer service 17, for example, as the number of 50 ms units contained within any frame that is longer than 50 ms. For example, a frame of 50 ms would contribute a value of 1 to a long frame score 19, while a frame of 510 ms would contribute a value of 10 to a long frame score 19. One example of a cause of long frames may include JavaScript code and/or libraries monopolizing the CPU in a way that prevents the browser from getting control and writing frames to the screen.

Another example of third party content performance metric information 18 may include CPU consumption 21 of the identified third party content 13. For example, analyzer service 17 may measure the amount of CPU consumed over a 30 second period when the identified third party content 13 is loaded on test webpage 15. One example cause of excessive CPU usage may be JavaScript code and/or libraries monopolizing the CPU in a way that prevents the browser from getting control and writing frames to the screen.

Another example of third party content performance metric information 18 may include byte information 23 of the identified third party content 13. Analyzer service 17 may determine a total number of bytes (KB) downloaded over the network for all third party content-related assets, including, but not limited to, HTML, JS, CSS, images, and analytics calls.

Another example of third party content performance metric information 18 may include a total number of requests 25 made by the identified third party content 13. For example, analyzer service 17 may track a the total number of HTTP requests over the network for all third party content-related assets, including, but not limited to, HTML, JS, CSS, images, and analytics calls.

In addition to the above examples, a plurality of other performance metric information may be captured by analyzer service 17 for each identified third party content 13, including, but not limited to, whether the third party content has flash, a size of the third party content, a number of HTML requests made by the third party content, a number of video requests made by the third party content, and/or a number of flash requests made by the third party content.

In an implementation, analyzer service 17 may generate third party content performance metric information 18 for the identified third party content. For example, analyzer service 17 may operate on one or more computer devices 110 in a controlled environment. Each of the one or more computer devices 110 may be identical to each other with a test webpage 15 operating on the computer devices 110. The test webpages 15 may be used to load and present the one or more identified third party content 13. The test webpages 15 may be uniform between computer devices 110 (e.g., the other content presented on the test pages may be the same among the test pages 15) and may be used to perform additional processing on the identified third party content 13. In addition, computer devices 110 may have other network traffic restricted from operating on computer devices 110. By analyzing the third party content performance in a controlled environment with restricted network traffic operating on computer devices 110, an accuracy of the results may be achieved. Moreover, with a vast number of third party content provided from a variety of locations rotating on websites 108 through various third party content exchanges, it is difficult to identify performance issues from the third party content. As such, by analyzing the third party content performance in a controlled environment, it may be possible to identify the third party content performance and areas of improvement for the third party content.

Computer devices 110 may each include an analyzer service 17 operable to analyze the third party content performance for each identified third party content 13 when the identified third party content 13 is loaded on the test webpage 15. For example, analyzer service 17 may trace an amount of CPU usage and/or Java script execution when the identified third party content 13 are presented on the test webpage 15. Because other network traffic is restricted on computer devices 110, analyzer service 17 may identify the amount of CPU usage and/or Java script execution used by the identified third party content 13.

Analyzer service 17 may capture information for each identified third party content 13 up to n identified third party content 13 (where n is an integer) that may provide proof of network and interactivity impacts on the test webpage 15. Analyzer services 17 may operate on a plurality of computer devices 110 so that a plurality of identified third party content 13 may be tested concurrently and may be used to analyze thousands of third party content.

Third party content manager 10 may receive the third party content performance metric information 18 for each identified third party content 13 from analyzer service 17 (FIG. 2) and may store the third party content performance metric information 18 received, for example, in a data repository. In addition, third party content manager 10 may transmit the third party content performance metric information 18 to a diagnostic component 22 for further analysis of the third party content performance metric information 18.

At 506, method 500 may include determining whether the third party content performance metric information is within a performance threshold level. Diagnostic component 22 may receive the third party content performance metric information 18 for the identified third party content 13, for example, from third party content manager 10 and may perform additional analysis on the third party content performance metric information 18. For example, diagnostic component 22 may compare the third party content performance metric information 18 to one or more performance thresholds 24 to determine whether the identified third party content 13 may affect the functionality or performance of the network and/or webpage 108. The performance thresholds 24 may be configurable values that may change based on a percentage of improvement for the network and/or webpage performance. For example, diagnostic component 22 may compare the long frame score 19, the CPU consumption 21, the byte information 23, and/or the total requests 25 to one or more performance thresholds 24. In an implementation, each of the long frame score 19, the CPU consumption 21, the byte information 23, and/or the total requests 25 may be associated with a different performance threshold 24. As such, when one or more of the long frame score 19, the CPU consumption 21, the byte information 23, and/or the total requests 25 exceeds the one or more performance thresholds 24, diagnostic component 22 may determine that identified third party content 13 may not be displayed on webpage 108 because the network and/or webpage 108 performance may be adversely impacted by the identified third party content 13 (e.g., delays in user interaction, lack of smoothness in animation, and/or delays in content loading).

Diagnostic component 22 may prepare a third party content control message 28 based on the comparison of the third party content performance metric information 18 to one or more performance thresholds 24. The third party content control message 28 may provide a presentation decision 27 for the identified third party content 13. When the third party content performance metric information 18 is below the one or more performance thresholds 24, the presentation decision 27 for the identified third party content 13 may be to continue to allow the identified third party content 13 to be displayed on webpage 108. However, when the third party content performance metric information 18 exceeds the one or more performance thresholds 24, the presentation decision 27 for the identified third party content 13 may be to prevent and/or block the identified third party content 13 from displaying on webpage 108. For example, when the long frame score 19 exceeds a performance threshold 24 and the CPU consumption 21 is below the performance threshold 24, the presentation decision 27 may be to prevent and/or block the identified third party content 13 from displaying on webpage 108.

At 508, method 500 may include sending a third party content control message that allows the presentation of the at least one third party content on the webpage. For example, notification component 30 may transmit the third party content control message 28 with the presentation decision 27 for the identified third party content 13 to webpage 108. Webpage 108 may continue to display the identified third party content 13 on webpage 108 when the presentation decision 27 is to continue to display the identified third party content 13 on webpage 108. Notification component 30 may also transmit the third party content control message 32 with the presentation decision 27 for the identified third party content 13 to third party content provider 106. Third party content provider 106 may continue to provide the identified third party content 13 in the third party content exchange and/or list of available third party content 37 provided to webpage 108 when the presentation decision 27 is to continue to display the identified third party content 13.

At 510, method 500 may include sending a third party content control message that prevents the at least one third party content from presentation on the webpage. For example, notification component 30 may transmit the third party content control message 28 with the presentation decision 27 for the identified third party content 13 to webpage 108. Webpage 108 may remove the identified third party content 13 from displaying on webpage 108 when the presentation decision 27 is to block and/or prevent the identified third party content 13 from display on webpage 108. In addition, notification component 30 may transmit the third party content control message 32 with the presentation decision 27 for the identified third party content 13 to third party content provider 106. For example, third party content provider 106 may remove the identified third party content 13 from the third party content exchange and/or the list of available third party content 37 presented to webpage 108 when the presentation decision is to block and/or remove the identified third party content 13 from webpage 108.

At 512, method 500 may optionally include determining whether the third party content revenue is above a revenue threshold. For example, diagnostic component 22 may further compare the third party content revenue 40 with a revenue threshold 26 to identify third party content that may provide a large amount of revenue. When the third party content revenue 40 exceeds the revenue threshold 26, diagnostic component 22 may determine that the identified third party content 13 provides large amounts of revenue. In an implementation, third party content control message 28 may be based on both the performance thresholds 24 and the revenue threshold 26. For example, if the identified third party content 13 exceeds both the performance thresholds 24 and the revenue thresholds 26, the presentation decision 27 may be to continue displaying the identified third party content 13 because of the large amount of revenue generated by the identified third party content 13 even though the performance of the identified third party content 13 may be adverse to webpage 108. Moreover, if the identified third party content 13 exceeds the performance thresholds 24 but is below the revenue threshold 26, the presentation decision 27 may be to prevent and/or block the identified third party content 13 from display on webpage 108. Another example may include when the identified third party content 13 is below both the performance thresholds 24 and the revenue threshold 26, the presentation decision 27 may be to continue displaying the identified third party content 13 on webpage 108.

At 514, method 500 may optionally include sending a recommendation to a third party content provider for the at least one third party content. Diagnostic component 22 may also take further actions regarding the identified third party content 13, such as providing one or more recommendations 34 for third party content improvement. Recommendations 34 may include, but are not limited to, identifying problem areas of the identified third party content 13 (e.g., long frame score 19, the CPU consumption 21, the byte information 23, and/or the total requests 25) based on the performance metric information 18 and/or the diagnostic information captured for the identified third party content 13 and/or providing one or more improvements for third party content performance. For example, when the CPU consumption 21 exceeds a performance threshold 24 level, diagnostic component 22 may provide one or more recommendations 34 for improving the CPU consumption 21 of the identified third party content 13. Moreover, when the third party content revenue 40 exceeds the revenue threshold 26 and one or more performance metric information 18 exceeds a performance threshold 24 level, diagnostic component 22 may provide one or more recommendations 34 for the identified third party content 13.

Notification component 30 may transmit the recommendations 34 to third party content provider 106 and/or a developer of the identified third party content 13 so that the performance of the identified third party content 13 may be improved. By providing recommendations 34 for third party content performance, third party content providers 106 and/or third party content developers may improve the performance of the third party content ecosystem resulting in improved user experiences when accessing webpages 108.

As such, the third party content ecosystem may be improved by proactively blocking heavy third party content before they appear on webpage 108 and/or reactively blocking heavy third party content after they appear on webpage 108. Moreover, by identifying problem areas of third party content and/or providing recommendations for improving third party content performance, the performance of webpages 108 may be improved, and thus, improving user interactivity with the webpages 108.

Figure 6:
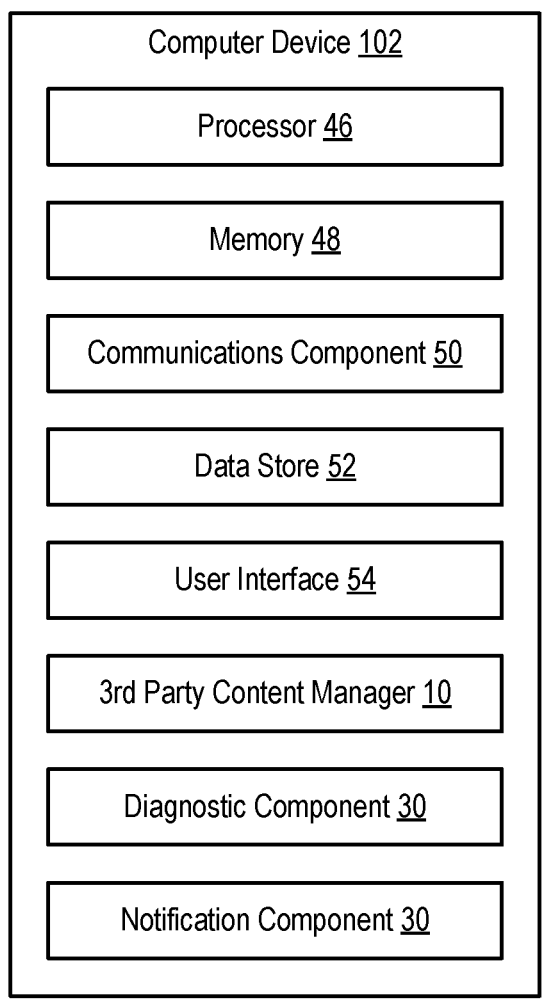
FIG. 6 is a schematic block diagram of an example device in accordance with an implementation of the present disclosure.

Referring now to FIG. 6, illustrated is an example computer device 102 in accordance with an implementation, including additional component details as compared to FIG. 1. Computer device 110 of FIG. 2 may also include the additional component details illustrated in FIG. 6. In one example, computer device 102 and/or computer device 110 may include processor 46 for carrying out processing functions associated with one or more of components and functions described herein. Processor 46 can include a single or multiple set of processors or multi-core processors. Moreover, processor 46 can be implemented as an integrated processing system and/or a distributed processing system.

Computer device 102 and/or computer device 110 may further include memory 48, such as for storing local versions of applications being executed by processor 46. Memory 48 can include a type of memory usable by a computer, such as random access memory (RAM), read only memory (ROM), tapes, magnetic discs, optical discs, volatile memory, non-volatile memory, and any combination thereof. Additionally, processor 46 and memory 48 may include and execute operating system 111 (FIG. 1).

Further, computer device 102 and/or computer device 110 may include a communications component 50 that provides for establishing and maintaining communications with one or more parties utilizing hardware, software, and services as described herein. Communications component 50 may carry communications between components on computer device 102 and/or computer device 110, as well as between computer device 102 and external devices, such as devices located across a communications network and/or devices serially or locally connected to computer device 102 and/or computer device 110. For example, communications component 50 may include one or more buses, and may further include transmit chain components and receive chain components associated with a transmitter and receiver, respectively, operable for interfacing with external devices.

Additionally, computer device 102 and/or computer device 110 may include a data store 52, which can be any suitable combination of hardware and/or software, that provides for mass storage of information, databases, and programs employed in connection with implementations described herein. For example, data store 52 may be a data repository for third party content manager 10 (FIG. 1), diagnostic component 22 (FIG. 1), notification component 30 (FIG. 1), and/or analyzer service 17 (FIG. 2).

Computer device 102 and/or computer device 110 may also include a user interface component 54 operable to receive inputs from a user of computer device 102 and/or computer device 110 and further operable to generate outputs for presentation to the user. User interface component 54 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 54 may include one or more output devices, including but not limited to a display, a speaker, a haptic feedback mechanism, a printer, any other mechanism capable of presenting an output to a user, or any combination thereof.

In an implementation, user interface component 54 may transmit and/or receive messages corresponding to the operation of third party content manager 10, diagnostic component 22, notification component 30, and/or analyzer service 17. In addition, processor 46 executes third party content manager 10, diagnostic component 22, notification component 30, and/or analyzer service 17, and memory 48 or data store 52 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
 memory configured to store data and instructions;
 at least one processor configured to communicate with the memory;
 an operating system configured to communicate with the memory and the processer, wherein the operating system is operable to:
  receive an identification of at least one third party content for analysis;
  receive third party content performance metric information for the at least one third party content based on an analysis of the at least one third party content, wherein the analysis of the at least one third party content occurs on a plurality of remote devices in a controlled environment and the third party content performance metric information identifies an impact of the at least one third party content on network performance or webpage performance in response to information collected by the plurality of remote devices when the at least one third party content is loaded and displayed on test webpages operating on the plurality of remote devices, wherein the plurality of remote devices analyze the at least one third party content in isolation with other network traffic being restricted from operating on the plurality of remote devices during the analysis and the test webpages are uniform among the plurality of remote devices;
  determine whether the third party content performance metric information is within a performance threshold level to determine whether the third party content affects the network performance or webpage performance; and
  send a third party content control message that prevents the at least one third party content from presentation on a webpage based at least on the third party content performance metric information exceeding the performance threshold level.

2. The computer device of claim 1, wherein the operating system is further operable to send a third party content control message that allows the presentation of the at least one third party content on the webpage based at least on the third party content performance metric information being within the performance threshold level.

3. The computer device of claim 1, wherein the operating system is further operable to:
 send recommendation to improve third party content performance to a third party content provider or a third party content developer associated with the at least one third party content.

4. The computer device of claim 3, wherein the operating system is further operable to:
 determine whether a third party content revenue for the at least one third party content exceeds a revenue threshold; and
 the recommendation is sent based at least on the third party content revenue exceeding the revenue threshold.

5. The computer device of claim 1, wherein the third party content performance metric information represents a performance of the at least one third party content.

6. The computer device of claim 1, wherein the operating system is further operable to capture diagnostic information of the at least one third party content during the analysis to identify impacts to the network performance or the webpage performance.

7. The computer device of claim 6, wherein the diagnostic information includes at least one of network waterfall information and a central processing unit (CPU) trace.

8. The computer device of claim 1, wherein the at least one third party content is one or more of a newly developed third party content and previously presented third party content.

9. The computer device of claim 1, wherein the plurality of remote devices are identical to each other and are used to perform additional processing on the at least one third party content.

10. The computer device of claim 1, wherein the operating system is further operable to:
 send a recommendation to change one or more areas of the at least one third party content to improve the third party content performance in response to the performance metric information, wherein the one or more areas of the at least one third party content include one or more of using a single version of a library, limiting a file size of the third party content within standards, reducing a number of JavaScript (JS) code used in the third party content, avoiding using long running scripts, avoiding using long running frames, avoiding CPU intensive operations, or ensuring network calls made and files downloaded are valid and required; and
 receive revised third party content in response to the recommendation.

11. A method for determining third party content to display on one or more webpages, the method comprising:
 receiving, at an operating system on a computer device, an identification of at least one third party content for analysis;
 receiving third party content performance metric information for the at least one third party content based on an analysis of the at least one third party content, wherein the analysis of the at least one third party content occurs on a plurality of remote devices in a controlled environment and the third party content performance metric information identifies an impact of the at least one third party content on network performance or webpage performance in response to information collected by the plurality of remote devices when the at least one third party content is loaded and displayed on test webpages operating on the plurality of remote devices, wherein the plurality of remote devices analyze the at least one third party content in isolation with other network traffic being restricted from operating on the plurality of remote devices during the analysis and the test webpages are uniform among the plurality of remote devices;
 determining whether the third party content performance metric information is within a performance threshold level to determine whether the third party content affects the network performance or webpage performance; and
 sending a third party content control message that prevents the at least one third party content from presentation on a webpage based at least on the third party content performance metric information exceeding the performance threshold level.

12. The method of claim 11, wherein the operating system is further operable to send a third party content control message that allows the presentation of the at least one third party content on the webpage based at least on the third party content performance metric information being within the performance threshold level.

13. The method of claim 11, further comprising:
sending recommendation to improve third party content performance to a third party content provider or a third party content developer associated with the at least one third party content.

14. The method of claim 13, further comprising:
determining whether a third party content revenue for the at least one third party content exceeds a revenue threshold; and
sending the recommendation based at least on the third party content revenue exceeding the revenue threshold.

15. The method of claim 11, wherein the third party content performance metric information represents a performance of the at least one third party content.

16. The method of claim 11, further comprising:
capturing diagnostic information of the at least one third party content during the analysis to identify impacts to the network performance or the webpage performance.

17. The method of claim 16, wherein the diagnostic information includes at least one of network waterfall information and a central processing unit (CPU) trace.

18. The method of claim 11, wherein the at least one third party content is one or more of a newly developed third party content and previously presented third party content.

19. A non-transitory computer-readable medium storing instructions executable by a computer device, comprising:
at least one instruction for causing the computer device to receive an identification of at least one third party content for analysis;
at least one instruction for causing the computer device to receive third party content performance metric information for the at least one third party content based on an analysis of the at least one third party content, wherein the analysis of the at least one third party content occurs on a plurality of remote devices in a controlled environment and the third party content performance metric information identifies an impact of the at least one third party content on network performance or webpage performance in response to information collected by the plurality of remote devices when the at least one third party content is loaded and displayed on test webpages operating on the plurality of remote devices, wherein the plurality of remote devices analyze the at least one third party content in isolation with other network traffic being restricted from operating on the plurality of remote devices during the analysis and the test webpages are uniform among the plurality of remote devices;
at least one instruction for causing the computer device to determine whether the third party content performance metric information is within a performance threshold level to determine whether the third party content affects the network performance or webpage performance; and
at least one instruction for causing the computer device to send a third party content control message that prevents the at least one third party content from presentation on a webpage based at least on the third party content performance metric information exceeding the performance threshold level.

20. The non-transitory computer-readable medium of claim 19, further comprising:
at least one instruction for causing the computer device to send a third party content control message that allows the presentation of the at least one third party content on the webpage based at least on the third party content performance metric information being within the performance threshold level.

* * * * *